United States Patent
Kantor et al.

(10) Patent No.: US 10,175,886 B1
(45) Date of Patent: Jan. 8, 2019

(54) SYSTEMS AND METHODS FOR HANDLING MISSING STORAGE IMAGE LAYERS WHILE PROVISIONING CONTAINERS IN COMPUTER CLUSTERS

(71) Applicant: Veritas Technologies LLC, Mountain View, CA (US)

(72) Inventors: Kody Kantor, Saint Paul, MN (US); Gaurav Makin, Shoreview, MN (US); John Kjell, Forest Lake, MN (US)

(73) Assignee: Veritas Technologies LLC, Mountain View, CA (US)

( * ) Notice: Subject to any disclaimer, the term of this patent is extended or adjusted under 35 U.S.C. 154(b) by 0 days.

(21) Appl. No.: 15/476,343

(22) Filed: Mar. 31, 2017

(51) Int. Cl.
  *G06F 13/00* (2006.01)
  *G06F 3/06* (2006.01)
  *G06F 17/30* (2006.01)

(52) U.S. Cl.
  CPC ............ *G06F 3/0604* (2013.01); *G06F 3/067* (2013.01); *G06F 3/0665* (2013.01); *G06F 3/065* (2013.01); *G06F 3/0647* (2013.01); *G06F 17/30079* (2013.01)

(58) Field of Classification Search
  CPC ...... G06F 3/0604; G06F 3/067; G06F 3/0665; G06F 3/0647; G06F 17/30079; G06F 3/065
  USPC ......... 711/154, 112, 114, 161; 707/639, 616, 707/641, 646, 649, 665, 610; 709/226, 709/213, 231, 232, 223; 717/168, 172, 717/177, 130
  See application file for complete search history.

(56) References Cited

U.S. PATENT DOCUMENTS

| | | | | |
|---|---|---|---|---|
| 8,380,674 | B1* | 2/2013 | Bolen | G06F 3/0617 707/657 |
| 8,423,731 | B1* | 4/2013 | Nadathur | G06F 11/1461 707/640 |
| 8,850,432 | B2* | 9/2014 | McGrath | G06F 9/5077 718/1 |

(Continued)

OTHER PUBLICATIONS

Harter; Slacker: Fast Distribution with Lazy Docker Containers; https://www.usenix.org/system/files/conference/fast16/fast16-papers-harter.pdf, as accessed Feb. 23, 2017; 14th USENIX Conference on File and Storage Technologies, Feb. 22-25, 2016.

(Continued)

*Primary Examiner* — Hong C Kim
(74) *Attorney, Agent, or Firm* — FisherBroyles LLP

(57) ABSTRACT

The disclosed computer-implemented method for provisioning containers in computer clusters may include (1) identifying a request to provision a container on a host system within a cluster, (2) determining that a missing storage layer image is not locally stored at the host system and initiating a transfer of the missing storage layer image to the host system, (3) creating the container and executing an application within the container on the host system before the missing storage layer image has been transferred to the host system, (4) remotely resolving a read request by reading from an instance of the missing storage layer image that is stored at a separate host system within the cluster, and (5) resolving a subsequent read request by reading from an instance of the missing storage layer image that is locally stored at the host system. Various other methods, systems, and computer-readable media are also disclosed.

20 Claims, 5 Drawing Sheets

(56) References Cited

U.S. PATENT DOCUMENTS

| | | | | |
|---|---|---|---|---|
| 9,678,683 | B1* | 6/2017 | Chen | G06F 3/0631 |
| 9,852,137 | B2* | 12/2017 | Mann | G06F 3/065 |
| 9,891,952 | B1* | 2/2018 | Chen | G06F 9/50 |
| 2014/0195490 | A1* | 7/2014 | Leverett | G06F 17/30088 |
| | | | | 707/639 |
| 2016/0378518 | A1* | 12/2016 | Antony | G06F 9/45533 |
| | | | | 718/1 |
| 2017/0083541 | A1* | 3/2017 | Mann | G06F 3/065 |
| 2017/0193611 | A1* | 7/2017 | Vassilev | G06Q 50/01 |
| 2018/0074748 | A1* | 3/2018 | Makin | G06F 3/0647 |

OTHER PUBLICATIONS

Docker; https://www.docker.com, as accessed on Feb. 23, 2017.

\* cited by examiner

SYSTEMS AND METHODS FOR HANDLING MISSING STORAGE IMAGE LAYERS WHILE PROVISIONING CONTAINERS IN COMPUTER CLUSTERS

BACKGROUND

In the past, many large-scale computing projects relied on large physical data centers with towering racks of computers. Now, distributed computing allows anyone with the resources to buy server space to run as many instances of their preferred computing stack as desired. Further efficiency improvements have been introduced in the form of application containers that allow administrators to run applications without requiring the resources necessary to simulate an entire virtualized operating system for each virtualized application. Containers reduce the processing and storage requirements for each application, allowing greater numbers of applications to be run on the same host.

However, with the flexibility and efficiency provided by containers comes greater pressures to maximize the opportunities that containers provide. As computing consumers rely increasingly on container technology and as computing service vendors attempt to improve their services while meeting performance objectives, some usage patterns of containers may present bottlenecks. For example, one advantage of containers over virtual machines is the ability to quickly start a new container. However, the ability to quickly start a container may be hampered by the location of an image used by the container. For example, if a container image is not present on the node which is meant to host the container, container startup time may be measured in minutes rather than seconds.

The instant disclosure, therefore, identifies and addresses a need for systems and methods for provisioning containers in computer clusters.

SUMMARY

As will be described in greater detail below, the instant disclosure describes various systems and methods for provisioning containers in computer clusters.

In one example, a computer-implemented method for provisioning containers in computer clusters may include (i) identifying a request to provision a container on a host system within a cluster including a group of host systems, the container to include a group of storage layer images, each successive storage layer image within the storage layer images describing a set of differences applied to a storage view from within the container by the storage layer image, (ii) determining, in response to the request, that a missing storage layer image within the storage layer images is not locally stored at the host system and initiating a transfer of the missing storage layer image to the host system, (iii) creating the container on the host system and executing an application within the container on the host system before the missing storage layer image has been transferred to the host system, (iv) receiving, from within the container, a read request that implicates the missing storage layer image and remotely resolving the read request by reading from an instance of the missing storage layer image that is stored at a separate host system within the cluster of host systems, and (v) resolving a subsequent read request that implicates the missing storage layer image after the missing storage layer image has been transferred to the host system by reading from an instance of the missing storage layer image that is locally stored at the host system.

In one embodiment, the missing storage layer image is stored at each host system within a subset of the host systems.

In one embodiment, the computer-implemented method may further include determining that a present storage layer image within the storage layer images is locally stored at the host system and resolving a read request that implicates the present storage layer image by reading from an instance of the present storage layer image locally stored at the host system.

In one embodiment, the cluster may include: a compute tier that includes the host systems and that provides primary storage for applications executing on the host systems and a data tier that includes a group of data nodes and that provides secondary storage for data generated by the applications executing on the host systems.

In one embodiment, the computer-implemented method may further include determining, in response to the request, that an additional missing storage layer image within the storage layer images is not available at any host system within the host systems and receiving, from within the container, an additional read request that implicates the additional missing storage layer image and remotely resolving the additional read request by reading from an instance of the additional missing storage layer image that is stored at a data node within the data nodes.

In one embodiment, the computer-implemented method may further include determining, in response to the request, that an additional missing storage layer image within the storage layer images is not locally stored at the host system and initiating a transfer of the additional missing storage layer image to the host system and receiving, from within the container, an additional read request that implicates the additional missing storage layer image and remotely resolving the additional read request by reading from an instance of the additional missing storage layer image that is stored at a third host system within the cluster of host systems.

In some examples, the computer-implemented method may further include selecting the third host system instead of the separate host system for resolving the additional read request to balance a load imposed on the separate host system and a load imposed on the third host system.

In one embodiment, the computer-implemented method may further include receiving, at the host system, a manifest of storage layer images stored locally for each host system within the host systems.

In one embodiment, the cluster implements storage reflection to store multiple instances of a volume across different host systems within the host systems when the volume is stored within the cluster.

In one embodiment, the cluster determines how many instances of the volume to store within the cluster based at least in part on a type of the volume.

In one embodiment, the cluster may store volumes that include storage layer images at a greater rate than at least one additional type of volume that is also subject to storage reflection.

In one embodiment, a system for implementing the above-described method may include (i) an identification module, stored in memory, that identifies a request to provision a container on a host system within a cluster including a group of host systems, the container to include a group of storage layer images, each successive storage layer image within the storage layer images describing a set of differences applied to a storage view from within the container by the storage layer image, (ii) a determination module, stored in memory, that determines, in response to the request, that a missing storage layer image within the storage layer images is not locally stored at the host system and initiates a transfer of the missing storage layer image to the host system, (iii) a creation module, stored in memory, that creates the container on the host system and execute an application within the container on the host system before the missing storage layer image has been transferred to the host system, (iv) a receiving module, stored in memory, that receives, from within the container, a read request that implicates the missing storage layer image and remotely resolves the read request by reading from an instance of the missing storage layer image that is stored at a separate host system within the cluster of host systems, (v) a resolving module, stored in memory, that resolves a subsequent read request that implicates the missing storage layer image after the missing storage layer image has been transferred to the host system by reading from an instance of the missing storage layer image that is locally stored at the host system, and (vi) at least one physical processor configured to execute the identification module, the determination module, the creation module, the receiving module, and the resolving module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify a request to provision a container on a host system within a cluster including a group of host systems, the container to include a group of storage layer images, each successive storage layer image within the storage layer images describing a set of differences applied to a storage view from within the container by the storage layer image, (ii) determine, in response to the request, that a missing storage layer image within the storage layer images is not locally stored at the host system and initiate a transfer of the missing storage layer image to the host system, (iii) create the container on the host system and executing an application within the container on the host system before the missing storage layer image has been transferred to the host system, (iv) receive, from within the container, a read request that implicates the missing storage layer image and remotely resolve the read request by reading from an instance of the missing storage layer image that is stored at a separate host system within the cluster of host systems, and (v) resolve a subsequent read request that implicates the missing storage layer image after the missing storage layer image has been transferred to the host system by reading from an instance of the missing storage layer image that is locally stored at the host system.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
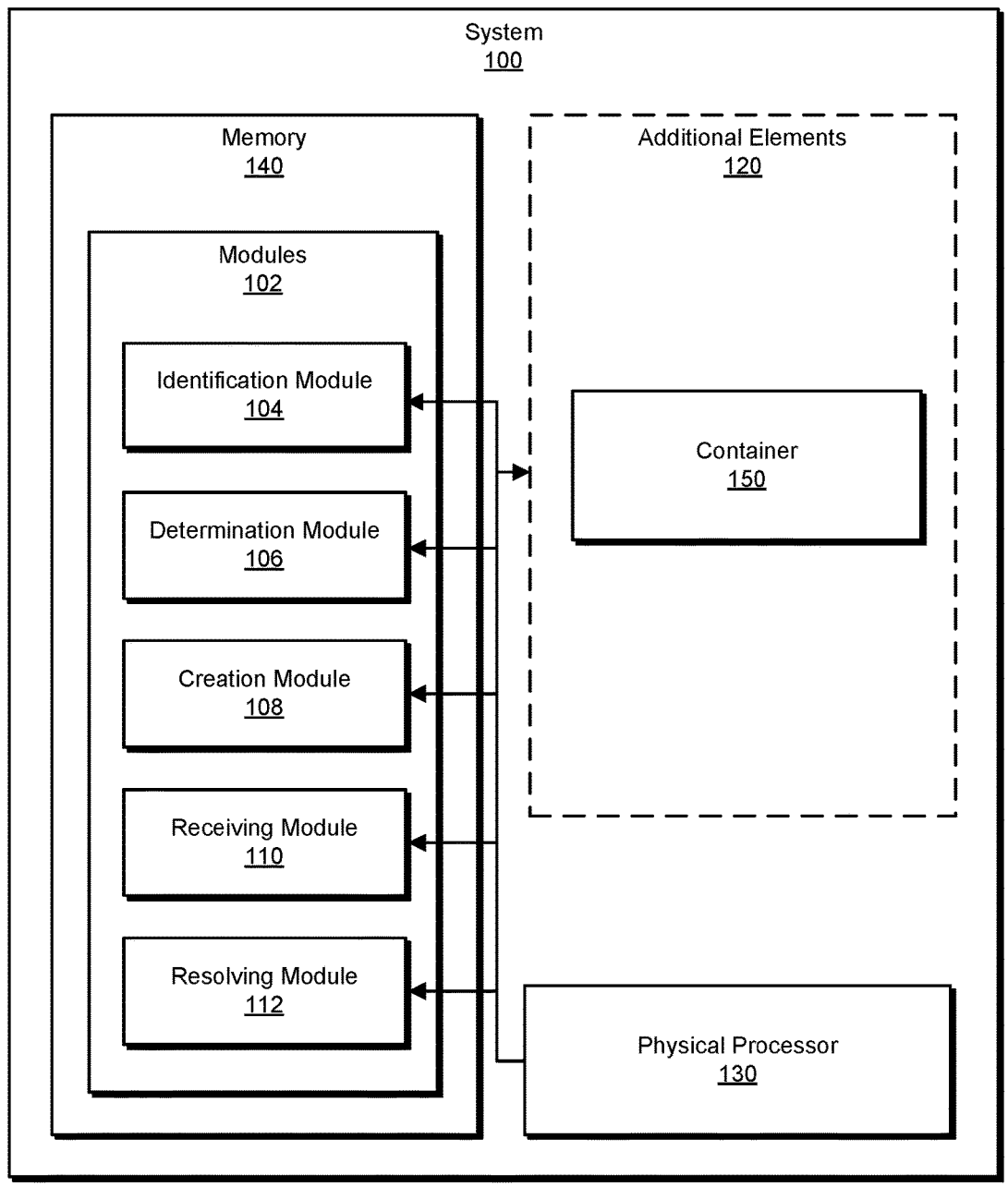
FIG. 1 is a block diagram of an example system for provisioning containers in computer clusters.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for provisioning containers in computer clusters. As will be explained in greater detail below, by starting a container on a node even when all layers relied upon by the container are not yet present on the node and fulfilling read requests from the container that pertain to a missing layer by forwarding the read requests to a remote node that has a copy of the missing layer (while, e.g., the missing layer is transferred in the background to the node that hosts the container), the systems and methods described herein may provide immediate provisioning for containers in cluster environments (without, e.g., requiring that each node in the cluster has a local copy of all possible layer images).

Moreover, the systems and methods described herein may improve the functioning and/or performance of a computing device itself. For example, by enabling a node in a cluster to immediately provision containers, the systems and methods described herein may improve the functioning of the node. In addition, the systems and methods described herein may thereby improve the functioning of the cluster as a computing system. Furthermore, by facilitating the immediate provisioning of containers without requiring separate copies of potentially required layer images to be locally stored on each node in a cluster in anticipation of the possible need for the layer images, the systems and methods described herein may conserve storage resources across the cluster and thereby improve the functioning of all the nodes within the cluster (e.g., by improving storage performance on the nodes for primary applications executing on the nodes).

Figure 2:
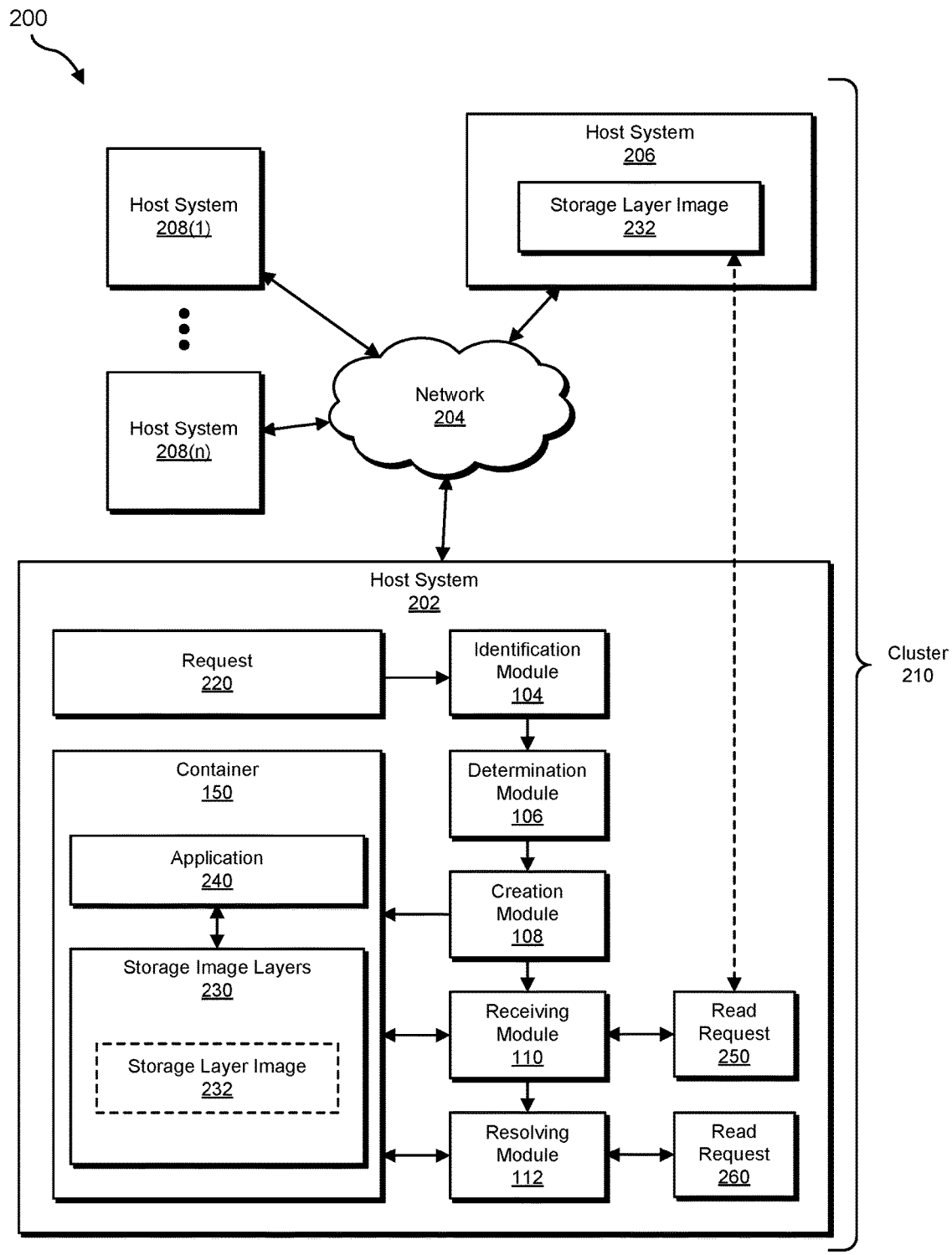
FIG. 2 is a block diagram of an additional example system for provisioning containers in computer clusters.
Figure 4:
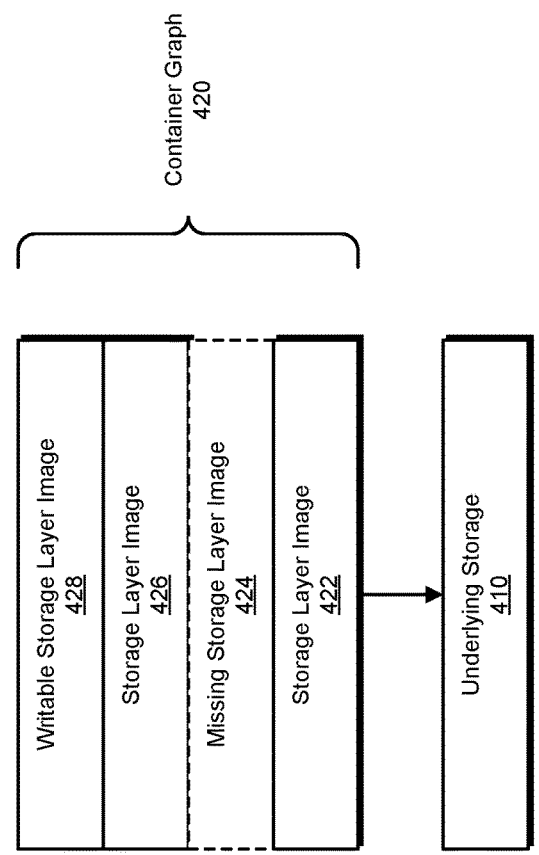
FIG. 4 is a block diagram of an example storage layering.
Figure 5:
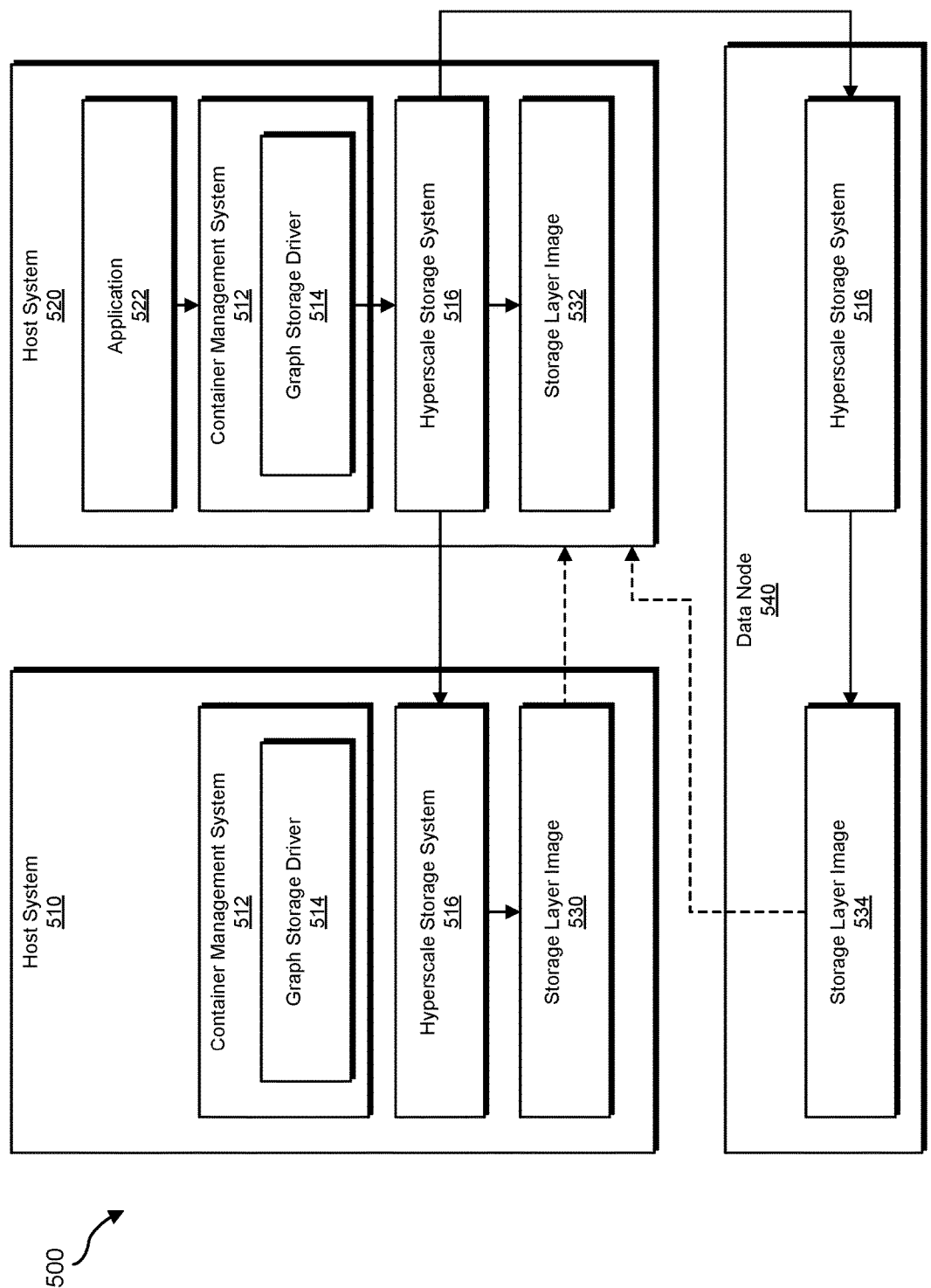
FIG. 5 is a block diagram of an additional example system for provisioning containers in computer clusters.

The following will provide, with reference to FIGS. 1, 2, and 5 detailed descriptions of example systems for provisioning containers in computer clusters. Detailed descriptions of corresponding computer-implemented methods will also be provided in connection with FIG. 3. In addition, detailed descriptions of an example storage layering will be provided in connection with FIG. 4.

FIG. 1 is a block diagram of example system 100 for provisioning containers in computer clusters. As illustrated in this figure, example system 100 may include one or more modules 102 for performing one or more tasks. For example, and as will be explained in greater detail below, example system 100 may include an identification module 104 that identifies a request to provision a container on a host system within a cluster that includes a plurality of host systems, the container to comprise a plurality of storage layer images, each successive storage layer image within the plurality of storage layer images describing a set of differences applied to a storage view from within the container by the storage layer image. Example system 100 may additionally include a determination module 106 that determines, in response to the request, that a missing storage layer image within the plurality of storage layer images is not locally stored at the host system and initiates a transfer of the missing storage layer image to the host system. Example system 100 may also include a creation module 108 that creates the container on the host system and execute an application within the container on the host system before the missing storage layer image has been transferred to the host system. Example system 100 may additionally include a receiving module 110 that receives, from within the container, a read request that implicates the missing storage layer image and remotely resolves the read request by reading from an instance of the missing storage layer image that is stored at a separate host system within the cluster of host systems. Example system 100 may also include a resolving module 112 that resolves a subsequent read request that implicates the missing storage layer image after the missing storage layer image has been transferred to the host system by reading from an instance of the missing storage layer image that is locally stored at the host system. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., host system 202 and/or host system 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate provisioning containers in computer clusters. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, example system 100 may also include one or more additional elements 120, such as container 150. Container 150 generally represents any type or form of partially virtualized environment (e.g., that allows one or more applications within the container at least partial direct access to the kernel of a system that hosts the container).

Example system 100 in FIG. 1 may be implemented in a variety of ways. For example, all or a portion of example system 100 may represent portions of example system 200 in FIG. 2. As shown in FIG. 2, system 200 may include a host system 202 in communication with a host system 206 via a network 204. In one example, all or a portion of the functionality of modules 102 may be performed by host system 202, host system 206, and/or any other suitable computing system. As will be described in greater detail below, one or more of modules 102 from FIG. 1 may, when executed by at least one processor of host system 202 and/or host system 206, enable host system 202 and/or host system 206 to provision a container 150 in a cluster 210.

Host system 202 generally represents any type or form of computing device capable of reading computer-executable instructions. For example, host system 202 may represent a node within a clustered computing environment. Additional examples of host system 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, so-called Internet-of-Things devices (e.g., smart appliances, etc.), gaming consoles, variations or combinations of one or more of the same, or any other suitable computing device.

Host system 206 generally represents any type or form of computing device capable of reading computer-executable instructions. For example, host system 206 may represent a node within a clustered computing environment. Additional examples of host system 206 include, without limitation, laptops, tablets, desktops, servers, cellular phones, Personal Digital Assistants (PDAs), multimedia players, embedded systems, wearable devices (e.g., smart watches, smart glasses, etc.), smart vehicles, so-called Internet-of-Things devices (e.g., smart appliances, etc.), gaming consoles, variations or combinations of one or more of the same, or any other suitable computing device.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Storage Area Network (SAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Many other devices or subsystems may be connected to computing system 100 in FIG. 1 and/or computing system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2.

Computing systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Figure 3:
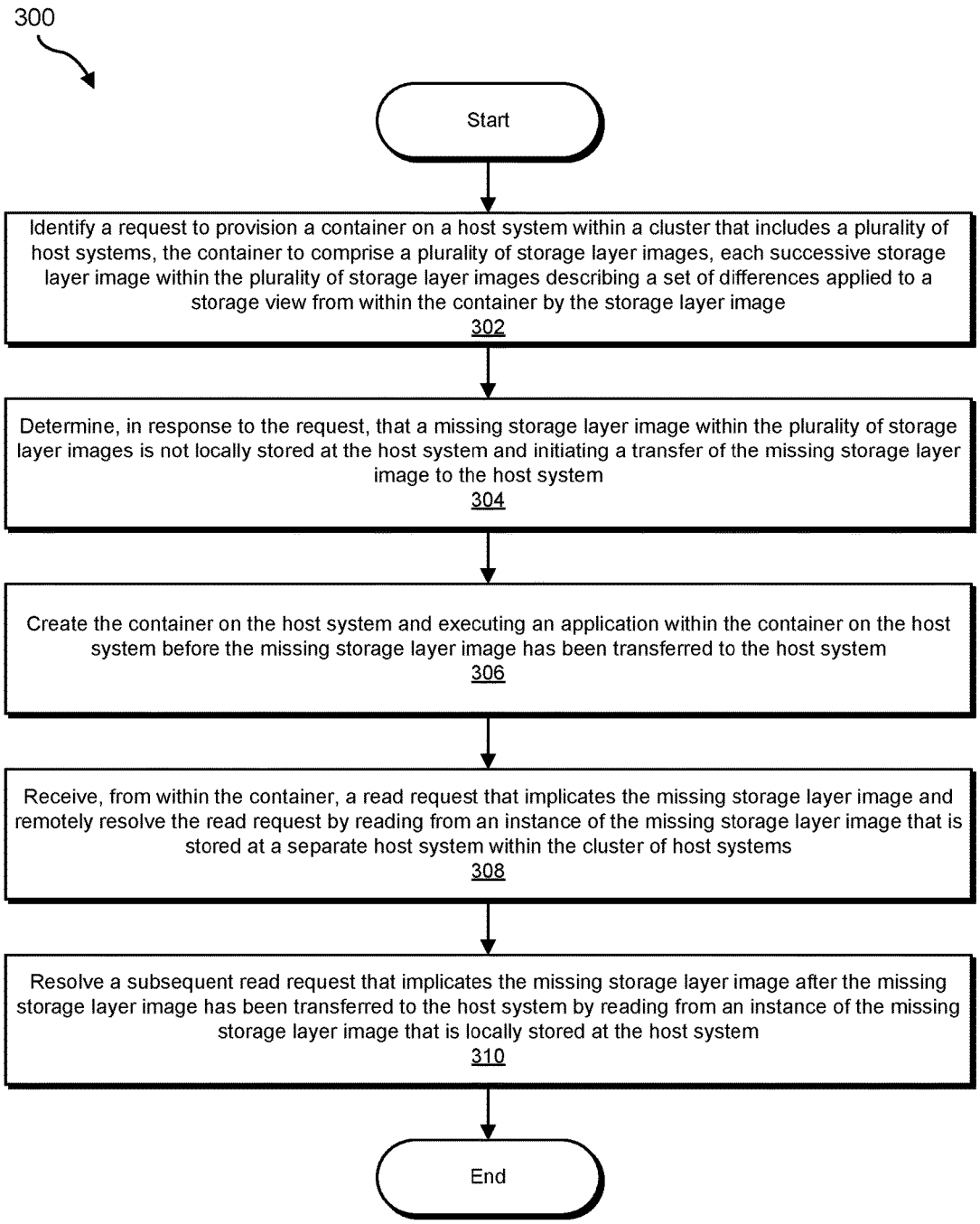
FIG. 3 is a flow diagram of an example method for provisioning containers in computer clusters.

FIG. 3 is a flow diagram of an example computer-implemented method 300 for provisioning containers in computer clusters. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may identify a request to provision a container on a host system within a cluster including a plurality of host systems, the container to include a plurality of storage layer images, each successive storage layer image within the plurality of storage layer images describing a set of differences applied to a storage view from within the container by the storage layer image. For example, identification module 104 may, as part of host system 202 in FIG. 2, identify request 220 to provision container 150 on host system 202 within cluster 210 that includes host systems 202, 206, and/or 208(1)-(n), where container 150 is to include storage layer images 230, each successive storage layer image within storage layer images 230 describing a set of differences applied to a storage view from within container 150 by the storage layer image.

The term "container," as used herein, generally refers to any type or form of partially virtualized environment (e.g., that allows one or more applications within the container at least partial access to the kernel of a system that hosts the container). Thus, for example, an application executing within a container on a host system and an application executing outside the container on the host system may access one or more file system resources on the host system in common (e.g., for read operations but not for write operations). In some embodiments, the resources and/or processes within a container may be isolated from resources and/or processes outside the application container and/or the application container may have a default configuration that specifies that communication from the application container to outside resources and/or processes pass through the kernel of the application container's host. In some examples, a container may be distinct from a virtual machine in that a container may not require hardware emulation and/or a complete and separate guest kernel that runs in isolation from a host kernel. Examples of containers include, without limitation, a DOCKER container.

In some examples, a container may provide virtualization for an application executing within the container by employing one or more storage layers that provide a different storage view to the application from within the container than an application outside the container would have. For example, a storage layer image may specify differences between an underlying image and a storage view presented when the storage layer is applied. Accordingly, a storage layer may specify file modifications, additions, and/or subtractions (e.g., such that the storage view of the host system from within a container shows modifications to a file, shows additional files, and/or fails to show files that are present on the host system), and/or modifications, additions, and/or subtractions to system parameters. In some examples, the application of multiple successive storage layers may apply successive masks to a storage view from within a container. In some examples, a specified collection of storage layers may be referred to as a "graph."

FIG. 4 illustrates an example storage layering 400. As shown in FIG. 4, storage layering may include a container graph 420 overlying an underlying storage 410. For example, a host system may store data, including, e.g., a kernel in underlying storage 410. A container with container graph 420 may operate on the host system, and an application within the container may view underlying storage 410 filtered through the layer images of container graph 420 rather than directly. Thus, a storage layer image 422 may apply differences to the application's view of underlying storage 410. In turn, a storage layer image 424 (potentially missing from the local storage of the host system) may apply differences to the application's view of the composite of storage layer image 422 and underlying storage 410. Storage layer image 426 may apply differences to the composite of images 424 and 422 and underlying storage 410. Finally, a writable storage image layer 428 may apply differences to the application's view of the composite of storage layer images 426, 424, and 422 and underlying storage 410. In some examples, the application within the container may not write to storage layer images 426, 424, or 422 (or to underlying storage 410). Instead, all writes may be absorbed by writable storage layer image 428. Because writable storage layer image 428 is the top-most layer, from the perspective of the application it may appear that an operation to overwrite data present in an underlying layer (e.g., storage layer image 426, 424, or 422 or underlying storage 410) was successful. In one example, storage layer image 422 may include operating system files (e.g., for DEBIAN), storage layer image 424 may include web server files (e.g., for APACHE), storage layer image 426 may include files for another application (e.g., EMACS), and writable storage layer image 428 may include data written by one or more applications executing within the container (e.g., MYSQL).

In some examples, multiple graphs may refer to a common storage layer image. Accordingly, in some examples, multiple containers may share a read-only storage layer. In some examples, the inclusion of a storage layer in a container may add functionality to the container (e.g., by including one or more stored resources and/or configurations that provision the container with an application and/or with functionality upon which an application may depend). In some examples, a storage layer image may include an operating system image (e.g., a particular version of UBUNTU or DEBIAN, etc.) above and beyond an underlying kernel. In some examples, a storage layer image may include an application image for provisioning a container with an application.

The term "host system," as used herein, generally refers to any computing system capable of hosting one or more application containers and/or coordinating with other systems within a cluster.

The term "cluster," as used herein, generally refers to any collection of computing systems that may coordinate and/or distribute one or more computing tasks. In some examples, externally a cluster may expose one or more services (e.g., hosting applications, providing storage, etc.) and internally a cluster may distribute responsibilities for providing support for the services amongst various nodes within the cluster.

In one example, the cluster may include (i) a compute tier that includes the host systems (e.g., that may host containers and/or applications) and that provides primary storage for applications executing on the host systems and (ii) a data tier that includes data nodes and that provides secondary storage for data generated by the applications executing on the host systems. In some examples, the cluster may copy data from the primary storage on the compute tier to the data tier (e.g., by periodically flushing the primary data to the data tier) for the use of one or more secondary applications. Examples of such secondary applications include, without limitation, backup applications, copy data management applications, and data analytic applications. In some examples, the cluster may include more host systems in the compute tier than data nodes in the data tier. For example, the cluster may include 1 data node for every 16 host systems. In some examples, the cluster may also include a control tier. Functions of computing systems within the control tier may include, without limitation, scheduling jobs (e.g., to be performed by deploying containers) and/or determining the placement of containers within the cluster.

Identification module 104 may identify the request to provision the container in any suitable context. For example, identification module 104 may observe and/or receive a command from an administrator to deploy a new container. Additionally or alternatively, identification module 104 may observe and/or receive an automated instruction to deploy a new container to perform a scheduled job. In some examples, identification module 104 may receive and/or observe an instruction from a control system within the cluster to provision the container on the host system.

Returning to FIG. 3, at step 304, one or more of the systems described herein may determine, in response to the request, that a missing storage layer image within the plurality of storage layer images is not locally stored at the host system and initiate a transfer of the missing storage layer image to the host system. For example, determination module 106 may, as part of host system 202 in FIG. 2, determine, in response to request 220, that missing storage layer image 232 within storage layer images 230 is not locally stored at host system 202 and initiate a transfer of missing storage layer image 232 to host system 202.

Determination module 106 may determine that the missing storage layer image is not locally stored at the host system in any suitable manner. For example, determination module 106 may identify, within the request to provision the container on the host system and/or within a data structure describing a graph of the container, an identifier of the missing storage layer. Determination module 106 may then determine that no storage layer image matching is locally stored at the host system. In some examples, determination module 106 may check a local storage location for the missing storage layer image and determine that the missing storage layer is not at the local storage location. Additionally or alternatively, determination module 106 may consult a data structure and/or receive a response to a query identifying the locations of storage layer images throughout the cluster and determine that the locations of the missing storage layer image do not include the host system.

In some examples, instances of a storage layer image may be distributed across various nodes within the cluster. In one example, the missing storage layer image is stored at each host system within a subset of the plurality of host systems. For example, the missing storage layer may be stored in one out of every ten host systems.

In one example, one or more of the systems described herein may receive, at the host system, a manifest of storage layer images stored locally for each host system within the plurality of host systems. In this manner, each host system may determine where storage layer images can be found when a storage layer image required for a container is not locally available.

In some examples, storage system volumes corresponding to one or more storage layer images (e.g., including the missing storage layer image) may be labeled with information identifying the content of the storage layer image. For example, a volume for a storage layer image that provides UBUNTU 14.04 may be labeled with UBUNTU 14.04. A cluster-aware storage driver that implements one or more of the systems or methods described herein may then recognize the volume as providing UBUNTU 14.04 when seeking a match for a missing storage layer. In some examples, a hyperscale storage system may provide for the immediate use of an image stored at a node across the cluster once the image is built.

In one example, the cluster may implement storage reflection to store multiple instances of a volume across different host systems within the plurality of host systems when the volume is stored within the cluster. In this manner, data access within the cluster may be scalable, as volumes may be redundantly available throughout the cluster while not needing to be stored on every node within the cluster. In some examples, the storage reflection rate for a given volume may be specified in terms of a proportion of nodes within the cluster that will locally store an instance of the volume. In other examples, the storage reflection rate for a given volume may be specified in terms of a fixed number of nodes that will locally store an instance of the volume.

In some examples, the cluster may determine how many instances of the volume to store within the cluster based at least in part on a type of the volume. For example, a type of volume that tends to be small, that tends to be requested frequently, and/or that is associated with operations that are latency-sensitive may be distributed across the cluster more widely than a type of volume that tends to be large, that tends to be requested infrequently, and/or that is associated with operations that are not latency-sensitive.

In one example, the cluster may store volumes that include storage layer images at a greater rate than at least one additional type of volume that is also subject to storage reflection. For example, the cluster may, by default, store volumes of a certain type at a rate of one out of every 20 nodes in the cluster. However, the cluster may be configured to store layer images at a rate of one out of every 10 nodes in the cluster.

Returning to FIG. 3, at step 306, one or more of the systems described herein may create the container on the host system and execute an application within the container on the host system before the missing storage layer image has been transferred to the host system. For example, creation module 108 may, as part of host system 202 in FIG. 2, create container 150 on the host system and execute application 240 within container 150 on the host system before missing storage layer image 232 has been transferred to the host system.

The term "application," as used herein, generally refers to any program, process, executable, job, task, and/or solution stack. In some examples, an application may execute from within a container, thereby having a partially virtualized interaction with the underlying host system. For example, writes performed by the application executing within the container may be applied to a writable storage layer image rather than to a target location that is read-only for the application (e.g., a target location in a read-only storage layer image used by the container and/or a target location within the underlying host storage). Examples of applications include, without limitation, web servers, databases, and document editors.

Creation module 108 may create the container in any suitable manner. For example, creation module 108 may create a partially virtualized execution environment configured to route input/output operations performed by an application through a sequence of storage layer images. As will be explained in greater detail below, creation module 108 may specify a storage layer image that is not locally available and, so, may temporarily involve the remote routing of input/output operations to a remotely stored instance of the storage layer image.

Returning to FIG. 3, at step 308, one or more of the systems described herein may receive, from within the container, a read request that implicates the missing storage layer image and remotely resolve the read request by reading from an instance of the missing storage layer image that is stored at a separate host system within the cluster of host systems. For example, receiving module 110 may, as part of host system 202 in FIG. 2, receive, from within container 150, read request 250 that implicates missing storage layer image 232 and remotely resolve read request 250 by reading from an instance of missing storage layer image 232 that is stored at separate host system 206 within cluster 210.

Receiving module 110 may receive the read request that implicates the missing storage layer in any suitable manner. For example, receiving module 110 may receive a read request for a file that is modified and/or added to a storage view of the application by the missing storage layer.

Receiving module 110 may remotely resolve the read request in any suitable manner. In some examples, upon receiving the read request receiving module 110 may send a request to the separate host system to return data (if any) that is found at the logical storage location that is specified by the request and found within missing storage layer. In some examples, receiving module 110 may attempt to resolve the read request at higher (i.e., later-applied) layers first, and only forward the read request to the separate host system if no higher layer specifies data at the target location of the read request. In some examples, receiving module 110 may consult a map and/or summary of the missing storage layer to determine whether the missing storage layer stores data for the target location of the request. For example, a summary of the missing storage layer may include a list of files that contain difference data within the missing storage layer. Additionally or alternatively, the summary may include a list of contiguous storage segments that within difference data may be found within the missing storage layer. In these example, receiving module 110 may forward the read request to the separate host system for resolution in response to determining that the summary indicates that the missing storage layer does (or may) store data for the target location. In some examples, the systems described herein may download the summary for the missing storage layer in response to the request to provision the container at the host system. In some examples, the systems described herein may distribute storage layer summaries to each node within the cluster so that the summaries are immediately locally available when a new container is to be provisioned.

As mentioned earlier, in some examples, the cluster may include a compute tier (e.g., that includes the host systems within the cluster) and a data tier (e.g., that includes data nodes). In one example, one or more of the systems described herein (e.g., determination module 106) may determine, in response to the request to provision the container, that an additional missing storage layer image within the plurality of storage layer images is not available at any host system within the plurality of host systems. In this example, receiving module 110 may receive, from within the container, an additional read request that implicates the additional missing storage layer image and remotely resolve the additional read request by reading from an instance of the additional missing storage layer image that is stored at a data node within the plurality of data nodes. Additionally or alternatively, one or more of the systems described herein may initiate a download of the additional missing storage layer from the data node to the compute tier. In some examples, these systems may prioritize attempting to download the additional missing storage layer from the data tier before attempting to download the additional missing storage layer from a repository outside the cluster.

In one example, one or more of the systems described herein (e.g., determination module 106) may determine, in response to the request, that an additional missing storage layer image within the plurality of storage layer images is not locally stored at the host system and initiate a transfer of the additional missing storage layer image to the host system. In this example, receiving module 110 may receive, from within the container, an additional read request that implicates the additional missing storage layer image and remotely resolve the additional read request by reading from an instance of the additional missing storage layer image that is stored at a third host system within the cluster of host systems. Thus, for example, at least two storage layer images may not be locally available on the host system, and the systems described herein may resolve remote read requests implicating the respective storage layer images through different host systems with local instances of the respective storage layer images.

The systems described herein may select a remote host system to which to direct read requests for a missing storage layer (e.g., when more than one remote host system stores a local instance of the missing storage layer) in any suitable manner. In some examples, the systems described herein may select the same remote host system for multiple missing layers. For example, if two storage layer images are missing from the local host system, and host system X has an instance of one of the storage layer images, system Y has an instance of the other storage layer image, and system Z has instances of both, the systems described herein may select system Z in order to minimize coordination and/or back-and-forth communication. In some examples, systems described herein may select a third host system for a second missing storage layer instead of the separate host system used for a first missing storage layer for resolving the additional read request to balance a load imposed on the separate host system and a load imposed on the third host system. In some examples, the systems described herein may select a single host system for remotely participating in read requests for multiple layers based on the multiple layers being adjacent.

Returning to FIG. 3, at step 310, one or more of the systems described herein may resolve a subsequent read request that implicates the missing storage layer image after the missing storage layer image has been transferred to the host system by reading from an instance of the missing storage layer image that is locally stored at the host system. For example, resolving module 112 may, as part of host system 202 in FIG. 2, resolve subsequent read request 260 that implicates missing storage layer image 232 after missing storage layer image 232 has been transferred to host system 202 by reading from an instance of missing storage layer image 232 that is locally stored at host system 202.

Resolving module 112 may resolve the subsequent read request in any suitable manner. For example, resolving module 112 may determine that the missing storage layer image has been completely transferred to the host system and may therefore direct the subsequent read request to the new local instance of the previously missing storage layer image. In some examples, resolving module 112 may determine that, even though the missing storage layer image has not been entirely transferred to the host system, a portion of the missing storage layer image relevant to the subsequent read request (e.g., a portion of the missing storage layer image including all difference data for a file that is a target of the subsequent read request) has been transferred.

In one example, systems described herein (e.g., determination module 106) may determine that a present storage layer image within the plurality of storage layer images is locally stored at the host system. In these examples, resolving module 112 may resolve a read request that implicates the present storage layer image by simply reading from an instance of the present storage layer image locally stored at the host system.

FIG. 5 illustrates an example system 500 for provisioning containers in clustered environments. As shown in FIG. 5, system 500 may include a host system 510 and a host system 520 (e.g., in a cluster) as well as a data node 540. A container management system 512 (e.g., DOCKER) may enable host systems 510 and 520 to host containers. A graph storage driver 514 may manage container storage layer images for container management system 512. A hyperscale storage system 516 may provide availability to images across the cluster. In one example, a new container (for an application 522) may be provisioned in host system 520. The new container may include a storage layer image 530 and a storage layer image 532 (and, in some examples, a storage layer image 534). However, while storage layer image 532 may be stored at host system 520, storage layer image 530 may not be stored at host system 530. Nevertheless, the container may be brought up immediately. Read operations performed by application 522 (mediated by graph storage driver 514 and hyperscale storage system 516) may be directed to host system 510 to hit storage layer image 530, thus allowing application 522 to successfully execute without a local instance of storage layer image 530. At the same time, systems described herein may begin downloading storage layer image 530 to host system 520 (e.g., from host system 510 and/or from another source). In some examples, the container for application 522 may also depend on storage layer image 534, which may also be absent from host system 520. Accordingly, in some examples, read operations by application 522 may be remotely fulfilled from storage layer image 534 on data node 540. Additionally or alternatively, host system 520 may retrieve storage layer image 534 from data node 540 (instead of, e.g., an image repository outside the cluster).

As explained above in connection with FIG. 3, an application and all of the dependencies for the application may be bundled into a single container that is independent from the host version a LINUX kernel, platform distribution, and/or deployment model. In some examples, container images may range in size from a few megabytes to a gigabyte or more. In some examples, image registries (e.g., servers) may store filesystem layers that make up a container image. These filesystem layers may be copy-on-write layers (e.g., difference layers), which may collectively be called a "graph." In one example, a container image (e.g., for MYSQL 5.5) may include a base image (e.g., UBUNTU) with a number of upper layers that include the necessary libraries and files to run the application. In some examples, container layers may be shared amongst container images. For example, MYSQL and MONGODB container images may share a base UBUNTU image.

In some examples, waiting to download a container image from an image registry before starting a container may significantly increase the time before an application is available on a node, particularly in a scale-out environment. However, replicating container registries on each production host may be resource-intensive.

Accordingly, the systems and methods described herein may provide a scalable mechanism to store and access container images. For example, these systems and methods may implement a cluster-aware graph storage driver for container images for a hyperscale storage system (e.g., VERITAS HYPERSCALE). Leveraging software-defined storage for containers, the graph driver can have information (e.g., by communicating with a hyperscale storage controller) regarding locations where the images are available in the cluster and provide instant recovery of the images from the cluster instead of waiting for images to download from a container image registry. By using reflection, the systems described herein may maintain N copies of container images. When the container is scheduled to run on a host which does not have the image, the systems described herein may start the image by issuing remote I/O. This may allow the systems described herein to start containers without having the image locally while downloading the image in the background from another source (e.g., an image registry, a peer node, and/or a data node).

In one example, a continuous integration (CI) and/or continuous deployment (CD) pipeline may build a container image. The CI/CD pipeline may upload the image to a central image registry. A user may then deploy an application including a group of containers, which may request hyperscale storage volumes. A hyperscale storage system may hook into a workload scheduler for the cluster and determine on which hosts to place the containers. The workload scheduler may then request the selected hosts to start the containers. If an image is deployed for the first time, the systems described herein may download the image from the central image repository. The hyperscale storage driver may be registered to each container host, such that the container may be registered on every host in the cluster. If the container images (backed by the hyperscale storage system) are present locally on the selected hosts, the container may be immediately started and the hyperscale storage system may issue local I/O to and from the images. If the container images (backed by the hyperscale storage system) are not present locally on the selected hosts, the container may be immediately started and the hyperscale storage system may issue remote I/O to and from the images (residing on another host or a data node). While remote I/O is occurring, images may be downloaded from the remote node and/or the central image registry. In either case, a container image may be created locally to serve all write operations.

In some examples, a data node for a hyperscale storage system (e.g., a VERITAS HYPERSCALE Datanode) may serve as back-end storage for a container image registry (e.g., a DOCKER container image registry). Thus, a cluster graph storage driver may implement awareness of the data node as an image repository and list all available images. This may provide a scalable solution to storing many container images while significantly improving start-up times for containers. Where the hyperscale storage data node serves as the central image registry, image layers may be registered as hyperscale storage volumes when ingested.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for provisioning containers in computer clusters, at least a portion of the method being performed by a computing device comprising at least one processor, the method comprising:

identifying a request to provision a container on a host system within a cluster comprising a plurality of host systems, the container to comprise a plurality of storage layer images, each successive storage layer image within the plurality of storage layer images describing a set of differences applied to a storage view from within the container by the storage layer image;

determining, in response to the request, that a missing storage layer image within the plurality of storage layer images is not locally stored at the host system and initiating a transfer of the missing storage layer image to the host system;

creating the container on the host system and executing an application within the container on the host system before the missing storage layer image has been transferred to the host system;

receiving, from within the container, a read request that implicates the missing storage layer image and remotely resolving the read request by reading from an instance of the missing storage layer image that is stored at a separate host system within the cluster of host systems; and resolving a subsequent read request that implicates the missing storage layer image after the missing storage layer image has been transferred to the host system by reading from an instance of the missing storage layer image that is locally stored at the host system.

2. The computer-implemented method of claim 1, wherein the missing storage layer image is stored at each host system within a subset of the plurality of host systems.

3. The computer-implemented method of claim 1, further comprising:

determining that a present storage layer image within the plurality of storage layer images is locally stored at the host system; and resolving a read request that implicates the present storage layer image by reading from an instance of the present storage layer image locally stored at the host system.

4. The computer-implemented method of claim 1, wherein the cluster comprises:

a compute tier that comprises the plurality of host systems and that provides primary storage for applications executing on the plurality of host systems; and a data tier that comprises a plurality of data nodes and that provides secondary storage for data generated by the applications executing on the plurality of host systems.

5. The computer-implemented method of claim 4, further comprising:

determining, in response to the request, that an additional missing storage layer image within the plurality of storage layer images is not available at any host system within the plurality of host systems; and receiving, from within the container, an additional read request that implicates the additional missing storage layer image and remotely resolving the additional read request by reading from an instance of the additional missing storage layer image that is stored at a data node within the plurality of data nodes.

6. The computer-implemented method of claim 1, further comprising:

determining, in response to the request, that an additional missing storage layer image within the plurality of storage layer images is not locally stored at the host system and initiating a transfer of the additional missing storage layer image to the host system; and receiving, from within the container, an additional read request that implicates the additional missing storage layer image and remotely resolving the additional read request by reading from an instance of the additional missing storage layer image that is stored at a third host system within the cluster of host systems.

7. The computer-implemented method of claim 6, further comprising selecting the third host system instead of the separate host system for resolving the additional read request to balance a load imposed on the separate host system and a load imposed on the third host system.

8. The computer-implemented method of claim 1, further comprising receiving, at the host system, a manifest of storage layer images stored locally for each host system within the plurality of host systems.

9. The computer-implemented method of claim 1, wherein the cluster implements storage reflection to store multiple instances of a volume across different host systems within the plurality of host systems when the volume is stored within the cluster.

10. The computer-implemented method of claim 9, wherein the cluster determines how many instances of the volume to store within the cluster based at least in part on a type of the volume.

11. The computer-implemented method of claim 10, wherein the cluster stores volumes comprising storage layer images at a greater rate than at least one additional type of volume that is also subject to storage reflection.

12. A system for provisioning containers in computer clusters, the system comprising:

an identification module, stored in memory, that identifies a request to provision a container on a host system within a cluster comprising a plurality of host systems, the container to comprise a plurality of storage layer images, each successive storage layer image within the plurality of storage layer images describing a set of differences applied to a storage view from within the container by the storage layer image;

a determination module, stored in memory, that determines, in response to the request, that a missing storage layer image within the plurality of storage layer images is not locally stored at the host system and initiates a transfer of the missing storage layer image to the host system;

a creation module, stored in memory, that creates the container on the host system and execute an application within the container on the host system before the missing storage layer image has been transferred to the host system;

a receiving module, stored in memory, that receives, from within the container, a read request that implicates the missing storage layer image and remotely resolves the read request by reading from an instance of the missing storage layer image that is stored at a separate host system within the cluster of host systems;

a resolving module, stored in memory, that resolves a subsequent read request that implicates the missing storage layer image after the missing storage layer image has been transferred to the host system by reading from an instance of the missing storage layer image that is locally stored at the host system; and at least one physical processor configured to execute the identification module, the determination module, the creation module, the receiving module, and the resolving module.

13. The system of claim 12, wherein the missing storage layer image is stored at each host system within a subset of the plurality of host systems.

14. The system of claim 12, wherein:
the determination module further determines that a present storage layer image within the plurality of storage layer images is locally stored at the host system; and
the resolving module further resolves a read request that implicates the present storage layer image by reading from an instance of the present storage layer image locally stored at the host system.

15. The system of claim 12, wherein the cluster comprises:
a compute tier that comprises the plurality of host systems and that provides primary storage for applications executing on the plurality of host systems; and
a data tier that comprises a plurality of data nodes and that provides secondary storage for data generated by the applications executing on the plurality of host systems.

16. The system of claim 15, wherein:
the determination module further determines, in response to the request, that an additional missing storage layer image within the plurality of storage layer images is not available at any host system within the plurality of host systems; and
the receiving module further receives, from within the container, an additional read request that implicates the additional missing storage layer image and remotely resolves the additional read request by reading from an instance of the additional missing storage layer image that is stored at a data node within the plurality of data nodes.

17. The system of claim 12, wherein:
the determination module further determines, in response to the request, that an additional missing storage layer image within the plurality of storage layer images is not locally stored at the host system and initiating a transfer of the additional missing storage layer image to the host system; and
the receiving module further receives, from within the container, an additional read request that implicates the additional missing storage layer image and remotely resolves the additional read request by reading from an instance of the additional missing storage layer image that is stored at a third host system within the cluster of host systems.

18. The system of claim 17, wherein the receiving module selects the third host system instead of the separate host system for resolving the additional read request to balance a load imposed on the separate host system and a load imposed on the third host system.

19. The system of claim 12, the determination module receives, at the host system, a manifest of storage layer images stored locally for each host system within the plurality of host systems.

20. A non-transitory computer-readable medium comprising one or more computer-readable instructions that, when executed by at least one processor of a computing device, cause the computing device to:
identify a request to provision a container on a host system within a cluster comprising a plurality of host systems, the container to comprise a plurality of storage layer images, each successive storage layer image within the plurality of storage layer images describing a set of differences applied to a storage view from within the container by the storage layer image;
determine, in response to the request, that a missing storage layer image within the plurality of storage layer images is not locally stored at the host system and initiate a transfer of the missing storage layer image to the host system;
create the container on the host system and executing an application within the container on the host system before the missing storage layer image has been transferred to the host system;
receive, from within the container, a read request that implicates the missing storage layer image and remotely resolve the read request by reading from an instance of the missing storage layer image that is stored at a separate host system within the cluster of host systems; and
resolve a subsequent read request that implicates the missing storage layer image after the missing storage layer image has been transferred to the host system by reading from an instance of the missing storage layer image that is locally stored at the host system.

* * * * *